Oct. 21, 1958 P. E. FISKE 2,857,558

ELECTRONICS PACKAGE

Filed Aug. 29, 1955

INVENTOR.

PAUL E. FISKE

BY George Lipkin

George E. Pearson

ATTORNEYS

United States Patent Office 2,857,558
Patented Oct. 21, 1958

2,857,558

ELECTRONICS PACKAGE

Paul E. Fiske, San Diego, Calif.

Application August 29, 1955, Serial No. 531,304
1 Claim. (Cl. 317—101)
(Granted under Title 35, U. S. Code (1952), sec. 266)

The invention described herein may be manufactured and used by or for the Government of the United States of America for governmental purposes without the payment of any royalties thereon or therefor.

This invention relates to an improved electronics package and more particularly to a package containing removable potted sub assemblies all of which have terminal connections on one side for easy inspection and template trouble-shooting, the sub assemblies being mounted in the package without large shock mounts yet withstand shock and vibration. The package is hermetically sealed yet may be opened without damage for replacement of parts and resealed.

Heretofore electronic components and circuits have been mounted on a metal chassis and shock mounted in containers which, at best, were difficult to seal and could not be opened without damage to the containers. The chassis had to be removed for checking, testing and replacing parts which had to be done by skilled technicians. The container, chassis and shock mounts were bulky and heavy.

The improved electronics package comprising the present invention is of molded plastic and opens only on one face. The package has channels or cells to which potted sub assemblies are fastened. The sub assemblies are enclosed in a foam type plastic and all connecting terminals are exposed on one face. A template is placed on the face with holes over the terminals and has printed thereon complete instructions for checking and testing. A re-usable hermetically sealed cover is provided and the package is roller mounted for easy placement and removal from an operational cabinet.

An object of this invention is the provision of an improved electronics package.

A further object is the provision of a package of electronic components and circuits having no metallic chassis or shock mounts and which effect a saving in weight and size.

A further object is the provision of a hermetically sealed electronics package which may be opened without damage and resealed.

Still another object is the provision of an electronics package of sub assembly components having connection terminals exposed on one face for template checking and testing by inexperienced technicians.

Figure 1:
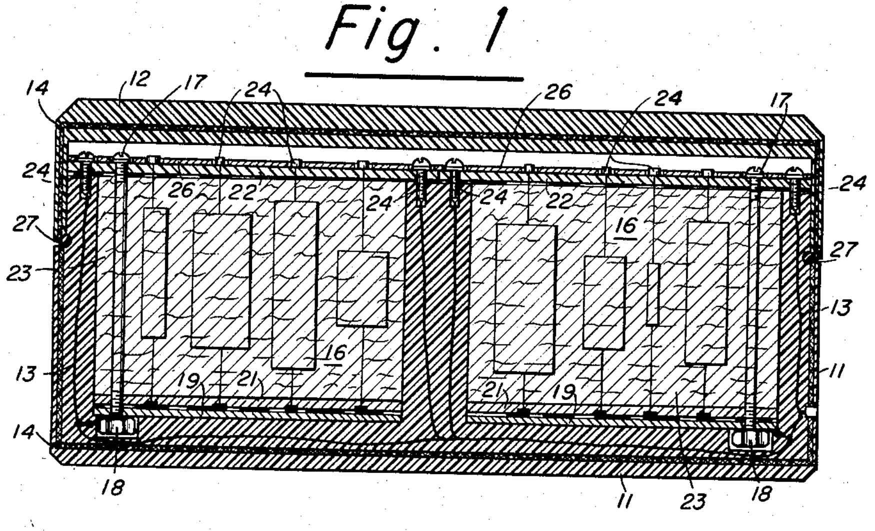
Figure 2:
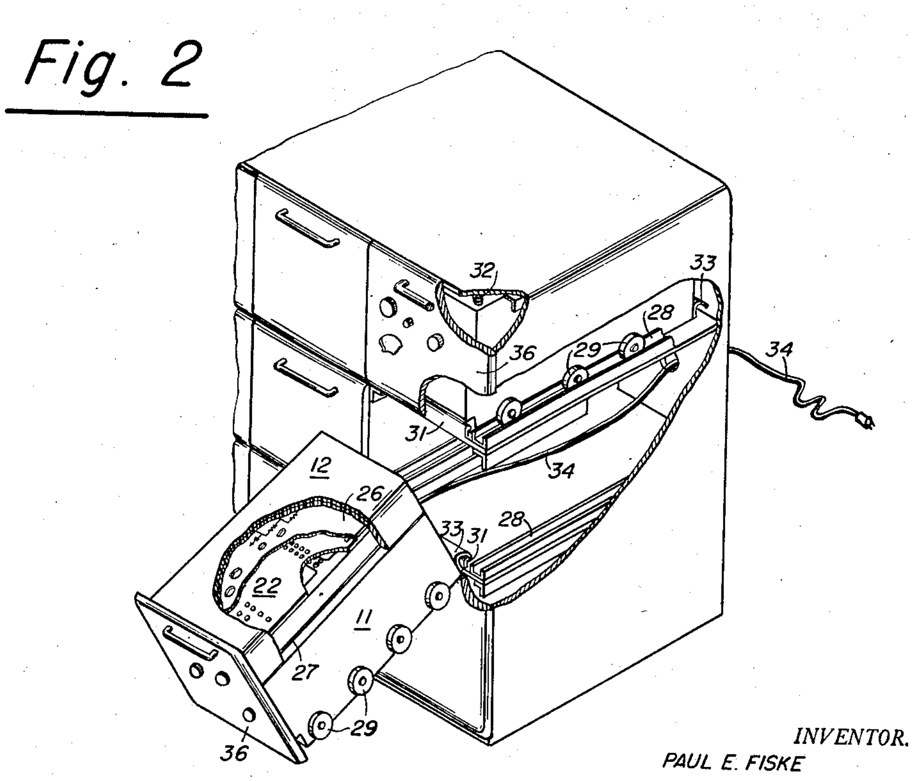

Other objects and many of the attendant advantages of this invention will be readily appreciated as the same becomes better understood by reference to the following detailed description when considered in connection with the accompanying drawings wherein:

Fig. 1 is a cross-sectional view of the basic package, cover and sub-assemblies; and Fig. 2 is a perspective view with parts broken away of a package mounted in an operational cabinet and one withdrawn for testing.

Referring now to the drawings wherein like numerals designate like parts throughout the several views, the basic package comprises container 11 and cover 12 preferably of molded plastic in which is embedded all interconnecting wiring 13 and screening 14 for structural strength and shielding. The container 11 is divided into cells into which potted sub assemblies 16 are fastened by means of screws 17 threaded into nuts 18 embedded in the bottom of the container beneath the printed wiring board 19 in the bottom of each cell. Each sub assembly 16 has top and bottom terminal boards 21 and 22 to which the components of the sub assembly are wired. The area between the terminal boards and around the components is filled with a foam type plastic 23. When all sub assemblies are installed, the package is essentially a solid block of foam type plastic around components and circuitry.

All terminal points and connections in both the sub assemblies 16 and printed wiring boards 19 have terminals 24 accessible from one face so that trouble shooting may be easily accomplished. In the field a template or card 26 is provided which is placed over the open side of the container. The card has holes punched to fit over the exposed terminals 24. The sequence of trouble shooting is printed on the card with wave forms, amplitude and other pertinent data for each lead. Instructions for scope sweep length, voltage scale and special precautions might also be included. In this manner the technician need not know anything regarding the operation of the equipment but only how to use the test equipment. For use at a manufacturing plant or large repair depot automatic inspection and trouble shooting could be provided. A board with spring loaded contacts could be pressed against the open face and connection made with each terminal 24. A stepping relay could test circuitry from point to point and when a fault appears the sequence would be interrupted, stopping the checking instrument at the point of trouble.

When used to package airborne or field types of equipment a cover 12 is placed over the open face. A rubber gasket 27 is in a recessed slot around the container near the open face. The cover is clamped in place so that a small gap or crack is formed in front of the gasket. This crack is then filled with an adhesive plastic which forms a hermetic seal. To remove the cover a hack saw is used to cut into the gasket to free the cover for removal. When reassembled a new gasket is installed and the package resealed. An alternate method of opening would be to install a small wire in the crack and around the gasket with the ends exposed. To open, the wire is pulled, breaking the seal. Both methods of sealing are more fully described in my copending application, Serial No. 518,420, filed June 27, 1955, now Patent No. 2,827,197.

When the module packaged sub assemblies comprising this invention are used for shipboard or aircraft type equipment, the container 11 could be mounted in a cabinet shown in Fig. 2. The cabinet is made of a channel shaped framework with the flat side out. The U-shaped members 28 form a trackway for supporting rubber wheels 29 fastened to the sides of the container 11. The trackway 28 has an abutting stop 31 to prevent the container 11 from accidentally rolling forward. A spring 32 at the top assists the gravitational force of the container in keeping the wheels 29 from accidentally jumping over the stop 31. The spring 32 and rubber wheels 29 additionally serve as shock mountings. A retaining bracket 33 engages stop 31 to hold the container 11 as shown to make all exposed terminals available for trouble shooting. The power supply cable 34 is preferably long enough to energize the sub assemblies during checking. The control panels 36 may be attached to the front of the containers, if desired.

In cases where certain of the components require cooling, these components could be mounted in the center of the container and provided with air cooling by passing air through a specially designed tube shield.

Obviously many modifications and variations of the present invention are possible in the light of the above teachings. It is therefore to be understood that within the scope of the appended claim the invention may be practiced otherwise than as specifically described.

What is claimed is:

In an electronics package, a container having cells therein for mounting sub assemblies, circuit means in the bottom of each of said cells, sub assembly electrical contact and retaining means in the bottom of said cells, means electrically connecting each of said circuit means together and to an electrical outlet connection, terminal connecting means embedded within the walls of said cells and exposed at the upper ends thereof, sub assemblies mounted within said cells and maintaining electrical contact with said circuit means, template means fitting over said upper ends of said walls of said cells, apertures in said templates over said exposed terminal connecting means, information indicia on said template for testing said sub assemblies, shock absorbing roller means mounted on said container to adapt said contained for engagement with a housing trackway, and retaining means mounted on said container to prevent accidental complete removal from said trackway, comprising a stop member for engaging said housing trackway upon withdrawal of said container and spring means mounted on the top of said container to urge said container and said roller means downwardly against said trackway when in closed position.

References Cited in the file of this patent

UNITED STATES PATENTS

| | | |
|---|---|---|
| 1,774,421 | Carpenter | Aug. 26, 1930 |
| 2,028,717 | Hayden | Jan. 21, 1936 |
| 2,077,160 | Wilson | Apr. 13, 1937 |
| 2,613,313 | Weeks | Oct. 7, 1952 |
| 2,647,224 | Bruck | July 28, 1953 |
| 2,737,579 | Wehrlin | Mar. 6, 1956 |